United States Patent [19]

Schwartz et al.

[11] 4,193,074
[45] Mar. 11, 1980

[54] ENHANCING RADAR RETURNS FROM TARGETS HAVING A SMALL RADAR CROSS SECTION

[75] Inventors: Edward C. Schwartz, Buffalo; Thomas F. Leney, Elma, both of N.Y.

[73] Assignee: Calspan Corporation, Buffalo, N.Y.

[21] Appl. No.: 530,566

[22] Filed: Dec. 3, 1974

[51] Int. Cl.² .............................................. G01S 9/22
[52] U.S. Cl. .................................................. 343/16 M
[58] Field of Search ........................ 343/16 M, 16 LS

[56] References Cited

U.S. PATENT DOCUMENTS

| | | | |
|---|---|---|---|
| 3,197,776 | 7/1965 | Winn | 343/16 M |
| 3,390,390 | 6/1968 | Vehrs, Jr. | 343/16 M |
| 3,392,387 | 7/1968 | Kirkpatrick | 343/16 M |
| 3,720,941 | 3/1973 | Ares | 343/16 M |
| 3,778,827 | 12/1973 | Strenglein | 343/16 M |

Primary Examiner—Maynard R. Wilbur
Assistant Examiner—Richard E. Berger
Attorney, Agent, or Firm—Allen J. Jaffe; David J. Zobkiw

[57] ABSTRACT

A method for locating weak targets such as power lines and tree tops in the presence of terrain clutter by separating the weak target from the clutter in the elevation plane.

4 Claims, 2 Drawing Figures

ENHANCING RADAR RETURNS FROM TARGETS HAVING A SMALL RADAR CROSS SECTION

The invention herein described was made in the course of or under a contract with the U.S. Air Force.

Military aircraft often include a terrain following system which employs a monopulse radar sensor to detect and locate all high terrain and obstacles relative to the aircraft in order to assure safe clearance. Unfortunately, radar returns from the highest obstacles such as tall trees or power lines have a very small radar cross section (generally less than 1 square meter), and, while these targets can be detected using a radar that is not receiver noise limited, they typically cannot be detected in the presence of strong terrain returns which come from beneath the wires (in the same pulse packet). Thus, the measured angle-of-arrival at the range of the power lines is biased more towards the ground than the wires.

If the transmitted energy could be weighted such as to direct more energy at the wires and less at the terrain beneath the wires, the probability of accurately locating the wires would be improved. One way to weight the transmitted power distribution is to transmit the radar power in an amplitude-monopoluse difference pattern in elevation. When an antenna so employed is scanned in elevation and the boresight becomes pointed directly at the large terrain target below the power lines, the radar return from the terrain target will be heavily de-emphasized relative to the wires as a result of the small part of the total energy that was transmitted toward the terrain. Thus, it is often possible to detect and accurately locate a small target when a much larger target is also located within the normal radar beam.

It is an object of this invention to provide a method for detecting and locating a small target when a much larger target is also located within the beam.

It is an additional object of this invention to provide a method for locating targets in the presence of strong terrain returns.

It is a further object of this invention to provide a method for locating one target in the presence of one or more additional targets.

It is a still further object of this invention to provide a method for locating, in the presence of terrain clutter, targets, such as power lines, that have a very small radar cross section. These objects, and other as will become apparent hereinafter, are accomplished by the present invention.

Basically the present invention provides a method for locating weak targets in the presence of terrain clutter where there is an angular separation (that is not too small) between the weak targets and the terrain clutter in the elevation angle and includes the steps of: directing the antenna boresight at the terrain beneath the weak target; transmitting a radar signal in an elevation difference pattern; and, processing the return signals.

BRIEF DESCRIPTION OF THE DRAWINGS

For a fuller understanding of the present invention, reference should be made to the following detailed description thereof taken in conjunction with the accompanying drawings wherein.

DESCRIPTION OF THE PREFERRED EMBODIMENT

Figure 1:
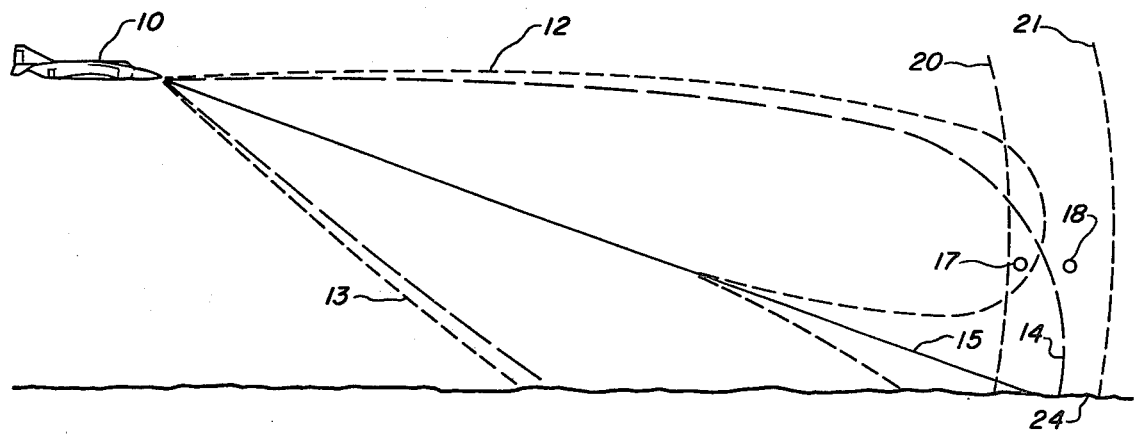
FIG. 1 is a representation of amplitude-monopulse sum and difference transmission patterns in the elevation plane.

In FIG. 1, the numeral 10 generally designates an airplane carrying a monopulse radar system. When transmitting in a difference pattern in elevation, as illustrated, a null or cusp is formed between upper lobe 12 and lower lobe 13 and lies long boresight 15. When transmitting in a sum pattern, a single lobe 14 is produced. The target wires 17 and 18 are located within a pulse packet defined by dotted lines 20 and 21 and which is of a width of $C\tau/2$ where C is the speed of light and, $\tau$ is the pulse length. The boresight 15 intersects the terrain 24 at a point below the wires 17 and 18 within the pulse packet. Since the antenna boresight 15 is directed at the terrain 24 beneath the wires 17 and 18, the terrain 24 is very weakly illuminated, i.e. has a low energy density, because it is located in the null whereas the wires 17 and 18 that are above terrain 24 would have received a stronger illumination, i.e. have a higher energy density. Thus, wires 17 and 18 can be more accurately located since the signal to clutter ratio (the signal being from the wires 17 and 18 and the clutter being the signal from the terrain 24 beneath the wires 17 and 18) will be much greater than if the sum pattern were used for the transmission.

Figure 2:
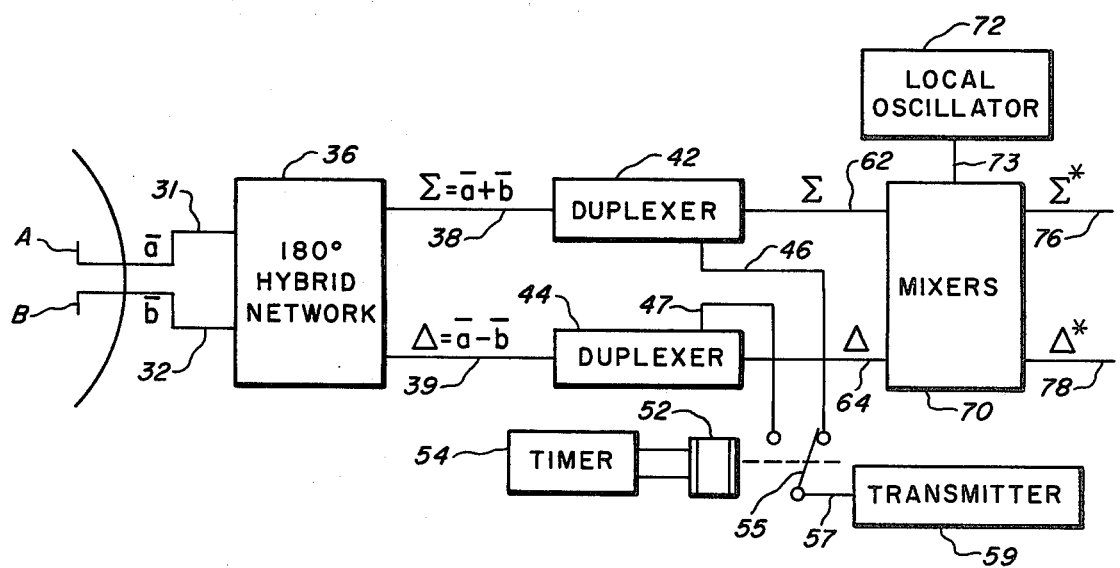
FIG. 2 is a block diagram of a radar system.

FIG. 2 illustrates the airplane carried radar system of FIG. 1. The waveguide feeds of a 2-horn monopulse radar antenna are designated A and B, respectively. When operating as a radar receiver, input signals $\bar{a}$ and $\bar{b}$ are supplied via lines 31 and 32, respectively, as inputs to the 180°hybrid network 36. A sum signal, $\Sigma = \bar{a} + \bar{b}$, which represents the vector sum of the signals supplied to network 36, is supplied as an input to duplexer 42 via line 38. A difference signal, $\Delta = \bar{a} - \bar{b}$, which represents the vector difference of the signals in elevation supplied to network 36, is supplied as an input to duplexer 44 via line 39 by network 36. The duplexers 42 and 44 which may be dual transmit-receive tubes couple the received $\Sigma$ and $\Delta$ signals to the mixers 70 via lines 62 and 64, respectively. The $\Sigma$ and $\Delta$ signals supplied to mixers 70 are at radar frequency. Local oscillator 72 is connected to mixers 70 via line 73 and serves to drive mixers 70 which convert the radar frequency inputs, $\Sigma$ and $\Delta$, into IF frequency outputs, $\Sigma^*$ and $\Delta^*$, which are supplied via lines 76 and 78 to processing equipment (not shown). A transmitter signal is alternately supplied to duplexers 42 and 44 via lines 46 and 47, respectively, which are alternately connected to transmitter 59 via switch 55 and line 57. Timer 54 controls relay or switch control 52 which actuates switch 55 to control the connection between transmitter 59 and duplexers 42 and 44. During the time of the transmitter pulse, the duplexers 42 and 44 provide a high isolation between the transmitter 59 and the mixers 70. The result of feeding duplexer 42 with the transmitter signal is transmission in a sum antenna pattern, lobe 14 of FIG. 1. The result of feeding duplexer 44 with the transmitter signal is transmission in a difference pattern, lobes 12 and 13 of FIG. 1.

OPERATION

Normal 2-horn monopulse processing is used to obtain the off-boresight angle ($\beta$) in elevation from the received signal where $\beta$ is given by the equation $\beta = |\Delta|/|\Sigma| k \cos \phi$, and where k is a proportionality factor, $\Sigma$ is the vector sum of the signals in the two horns, $\Delta$ is the vector difference of the signals in the two horns and $\phi$ is the vector phase angle between the $\Sigma$ and $\Delta$ signal at both the radar and the intermediate frequency. While transmitting in the conventional Σ pattern, this processing would ordinarily not detect a target having a very small radar cross section in the presence of strong terrain returns in the same pulse packet.

Referring first to FIG. 1, the airplane-carried monopulse radar system 10, when transmitting in a difference pattern in elevation, will produce a null or cusp between the lobes 12 and 13 and along boresight 15. When the antenna is properly directed, the boresight 15 will intersect the terrain 24 in the area of the null and will thereby produce a very weak return signal. However, if a normally weak target such as wires 17 and 18 are located in the same pulse packet within or near the upper lobe 12 and above the intersection of the boresight 15 with the terrain 24, the resulting return signal will be stronger than that of the underlying terrain 24 and by proper off-boresight processing, the target may be accurately located.

Although FIG. 1 illustrates how the weak target can be located, the technique requires an angular separation between the weak target and the terrain clutter in the elevation angle and the underlying terrain must be located in the null or cusp near the boresight. Obviously, the boresight 15 can be deliberately made to intersect the terrain 24 underlying the target only if the location of the target is known and that is the information sought. Functioning in a conventional manner the terrain following monopulse radar system of FIG. 2 generates sum, Σ, and difference, Δ, signals from which the off-boresight angle, β, is determined. Cylically the transmitter 59 is alternately connected to duplexers 42 and 44 and is actuated, the duplexers 42 and 44 prevent the transmitter signal from entering the mixers 70. This periodically results in the alternate supplying of the Σ or Δ transmissions and where, as in the case illustrated in FIG. 1, the conditions for locating the target having the very small radar cross section are met, the target location, i.e. wires 17 and 18, will be defined by the resultant β determination. Thus, in the described system, a scanning antenna is used, but the return signals are processed such as to recognize the desired targets when the antenna is eventually properly directed.

Although a preferred embodiment of the present invention has been illustrated and described, other changes will occur to those skilled in the art. For example, although the invention has been described in terms of a 2-horm monopulse radar it is obvious that it is applicable to a 4-horn monopulse radar since all of the necessary data is generated in such a system. Also, while an elevation sum and difference pattern has been described, there is no requirement that the device be so oriented and other sum and difference pattern orientations or rotations can be used. Additionally, the present invention can be adapted to a radar system using audio and sound waves or any other system incorporating the features of a monpulse system, such as a phased array antenna, which can produce comparable patterns and results. The invention is adaptable to a ground based system for such uses as air traffic control of low flying planes. While the present invention has been described in terms of a weak target located above the terrain, the invention is applicable to separating other targets such as two near targets, weak targets in the presence of a strong target, or other weak targets, by automatically pointing at one target and then the other and processing the returns as of a strong target, or other weak targets, by automatically pointing at one target and then the other and processing the returns as described above. It is therefore intended that the scope of the present invention is to be limited only by the scope of the appended claims.

We claim:

1. A method for locating one target in the presence of a second target such as clutter which is present and unresolved in the same pulse packet by separating said targets in the monopulse plane including the steps of:

directing a radar antenna boresight at said second target;

alternately, cyclically transmitting a radar signal in sum and difference pattern; and processing return signals, whereby, if said one target is present in any pulse packet and located in one of the lobes of the difference pattern transmission, the signal to clutter ratio in said return signals from said one target will be greater when transmission is in the difference pattern than in the sum pattern when there is an angular separation between said one target and said second target in the monopulse plane, and, thereby the presence of said one target will be identified and said one target located.

2. A method for locating a weak target in the presence of terrain clutter in the same pulse packet for use in a monopulse radar terrain-following system including the steps of:

directing the radar antenna boresight at the terrain that is at the range of said weak target;

alternately, cyclically transmitting a radar signal in an elevation sum and an elevation difference pattern; and processing return signals, whereby, if a weak target is present in any pulse packet and located in one of the lobes of the difference pattern transmission, the signal-to-clutter ratio in the return signals from said weak target will be greater from transmissions in the elevation difference pattern than in the elevation sum pattern when there is an angular separation between the weak target and the terrain clutter in the elevation angle, and, thereby the presence of the weak target will be identified and said weak target located.

3. A method for locating one target in the presence of a second target in a pulse packet by separating said targets in the elevation plane including the steps of:

directing a radar antenna boresight at said second target;

alternately, cyclically transmitting a radar signal in an elevation sum and an elevation difference pattern; and processing return signals, whreby, if said one target is present in any pulse packet and located in one of the lobes of the difference pattern transmission, the signal to clutter ratio in said return signals from said one target will be greater when transmission is in the elevation difference pattern than in the elevation sum pattern when there is an angular separation between said one target and said second target in the elevation angle, and, thereby the presence of said one target will be identified and said one target located.

4. A method for locating one target in the presence of a second target in the same pulse packet by separating said targets in the monopulse plane including the steps of:

directing a radar antenna boresight at said second target;

transmitting a radar signal in difference pattern; and processing return signals, whereby if said one target is present in any pulse packet and located in one of the lobes of the difference pattern transmission, return signals from said one target will be maintained while return signals from said second target will be suppressed and thereby the presence of said one target will be identified and said one target located.

* * * * *